United States Patent [19]
Gilles et al.

[11] 3,904,027
[45] Sept. 9, 1975

[54] DOCUMENT DISTRIBUTION SYSTEM

[76] Inventors: John R. Gilles, 2420 Fourth Ave., Arcadia, Calif. 91006; William F. McFarland, 6650 Densmore, Van Nuys, Calif. 91408; Jess W. Spears, 504 S. Marguerita, Alhambra, Calif. 91802

[22] Filed: Jan. 2, 1974

[21] Appl. No.: 430,275

[52] U.S. Cl. ............... 198/180; 198/38; 214/1 BA; 294/110; 294/114
[51] Int. Cl.² .................................... B65G 17/00
[58] Field of Search ...... 198/180, 38, 179; 294/101, 294/106, 110, 114; 214/1 BA

[56] References Cited
UNITED STATES PATENTS

| | | | |
|---|---|---|---|
| 1,686,174 | 10/1928 | Rauschenberger | 198/179 X |
| 2,362,098 | 11/1944 | Rundell | 198/179 |
| 3,023,878 | 3/1962 | Forsthoff et al. | 198/38 |

Primary Examiner—Evon C. Blunk
Assistant Examiner—Douglas D. Watts
Attorney, Agent, or Firm—Harvey S. Hertz

[57] ABSTRACT

A document distribution system contains first and second spring-loaded members between which documents can be carried. The first spring-loaded member is integrally connected to a releasing mechanism, which when actuated, separates the spring-loading members freeing the document. The first spring-loaded member and the releasing mechanism pivots about the same point on a housing. The second spring-loaded member pivots about a second point on the housing. The housing is secured to a stabilizer which retains the housing in a predetermined position when the releasing mechanism is actuated. A trolley is pivotably secured to the stabilizer and is attached to a movable member for transporting the stabilizer and housing along a track.

3 Claims, 4 Drawing Figures

PATENTED SEP 9 1975 3,904,027 ns in which like reference numerals designate like parts throughout the FIGURES.

DOCUMENT DISTRIBUTION SYSTEM

BACKGROUND OF THE INVENTION

1. Field of the invention.

The field of art to which the invention pertains includes the field of conveyor systems, particularly, with respect to a distribution system for transporting documents around a large area.

2. Description of the prior art.

Conventional paper distribution systems for use in offices, warehouses or factories are either of the endless belt distribution system or the pneumatic tube feed system. In the pneumatic tube feed system a document is placed in a carrier and transported to a station. Where large numbers of stations are required, the system becomes expensive to install. An alternative arrangement is the use of the endless conveyor system wherein carriers are continuously transported on a track and documents can be inserted at any point along the track. A plurality of stations are provided which operate to distribute the papers to the correct station. Such a system enables large numbers of people to utilize the system. In one arrangement, the system utilizes a first and a second spring-loaded member. One of the spring-loaded members is actuated by a releasing mechanism enabling the spring-loaded members to separate and causing a paper therebetween to be released at a predetermined station. It has been found in certain instances that the spring-loaded member actuated by the releasing mechanism may not return to its predetermined loaded position. Thus, paper cannot be inserted for subsequent use of the carrier until an adjustment is made. In addition, it has been found that where the spring-loaded member does return, that under certain circumstances, it is necessary to adjust the spacing between the spring-loaded members. Such adjustments require that the loading springs be adjusted or changed, causing a shutdown of the system when one of the carriers is removed. In addition, such a system is relatively complex to manufacture.

The present invention provides a releasing mechanism which is interconnected with one of the spring-loaded members so that upon actuation of the releasing member, the spring-loaded mechanism will return to its original position. Adjustments of the spacing between the spring-loaded members can be easily performed while the carrier remains directly on the conveyor system.

SUMMARY OF THE INVENTION

A document distribution system includes a first and second spring-loaded members between which a document can be secured. The first spring-loaded member is integrally connected to a releasing mechanism for enabling the spring-loaded member and the releasing mechanism to be pivotable about the same point on a housing. The second spring-loaded member is movable about a second pivot point on the housing. The housing is secured to a stabilizer for retaining the housing in a predetermined position when the document is released from between the spring-loaded members. A trolley is pivotably secured to the stabilizer and attached to a movable member for transporting the stabilizer and the housing along a track.

The advantages of this invention, both as to its construction and mode of operation, will be readily appreciated as the same becomes better understood by reference to the following detailed description when considered in connection with the accompanying drawings in which like reference numerals designate like parts throughout the FIGURES.

DESCRIPTION OF THE PREFERRED EMBODIMENTS

Figure 1:
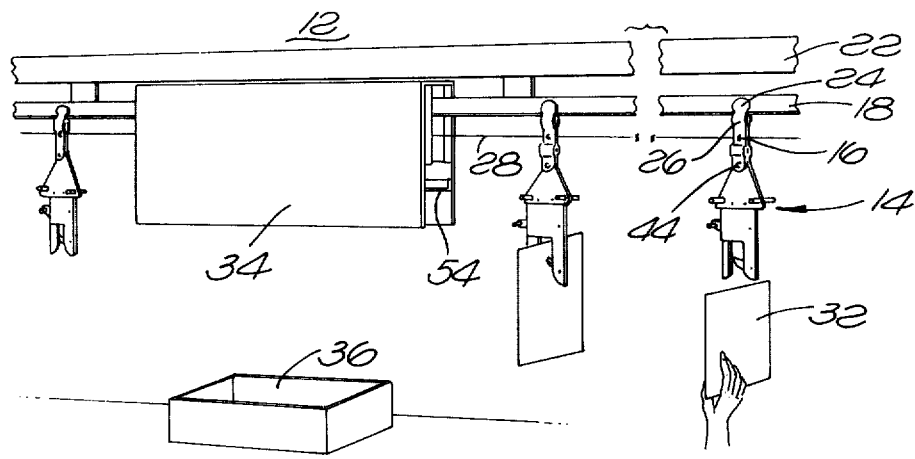
FIG. 1 is a perspective view of a portion of the document distribution system.

Referring now to the drawings, there is shown in FIG. 1, a document distribution system 12 constructed in accordance with principles of the invention. The system comprises a document carrier 14 which is mounted by means of a trolley 16 onto a track structure 18. The trolley 16 and track structure 18 are conventional and form no part of the invention. The track structure 18 normally is mounted by means of a support 22 to a wall (not shown) in the facility where it is desired to provide a document distribution system. The trolley 16 contains wheels 24 which guide the trolley 16 along the track structure 18. The trolley 16 is secured by means of jaws 26 to a wire 28. As the wire moves, the trolley 16 and the carrier 14 are transported along the track structure 18.

As can be seen in FIG. 1 a document, such as a paper 32 can be inserted into the carrier 14 in such a manner that the carrier holds the paper, as is illustrated by the carrier 14 in the center in FIG. 1. When the carrier reaches a station 34, the paper 32 may be deposited in a container 36. It should be noted, that in conventional document distribution systems, a plurality of stations 34 are provided, and that certain of the carriers 14 are actuated to release a document at only certain of the stations. Thus, by color coding or otherwise marking certain of the carriers, the person inserting the paper 32 onto the carrier 14 will choose the correct carrier for depositing the paper at a desired station.

Figure 2:
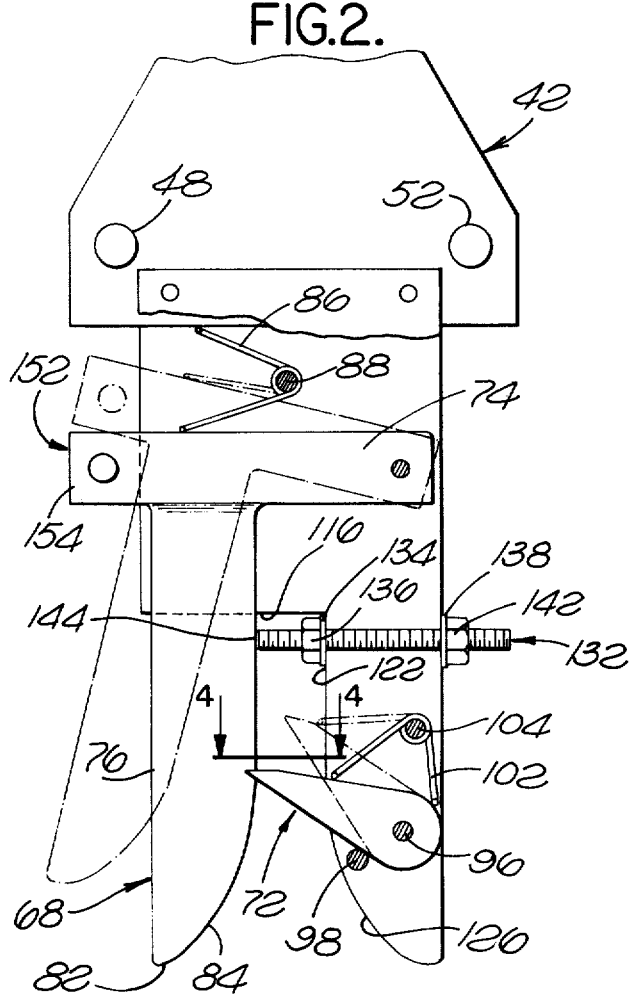
FIG. 2 is a planar view of a portion of the carrier used in the system of FIG. 1 and illustrating its various positions.

Referring now to FIG. 2, a portion of the carrier 14 is shown in greater detail. The carrier 14 comprises a stabilizer 42 which tapers to an upper point (shown in FIG. 1) where it is joined to the trolley 16 by means of a pivotal connection 44. The pivotal connection enables the stabilizer 42 to remain in a generally vertical position as the trolley 16 follows the tracks at vertical bends and at changes in elevation of the track 18. The lower portion 46 of the stabilizer 42 contains a pair of pins 48 and 52 which are formed in a plane perpendicular to the plane of the stabilizer. When the stabilizer passes through the station 34, the pins 48 and 52 ride directly below station flanges 54. Thus, when the paper held by the carrier 14 is released in the station, the pins 48 and 52 abut the flange 54 and prevent the carrier from pivoting about the pivot point 44.

Figure 3:
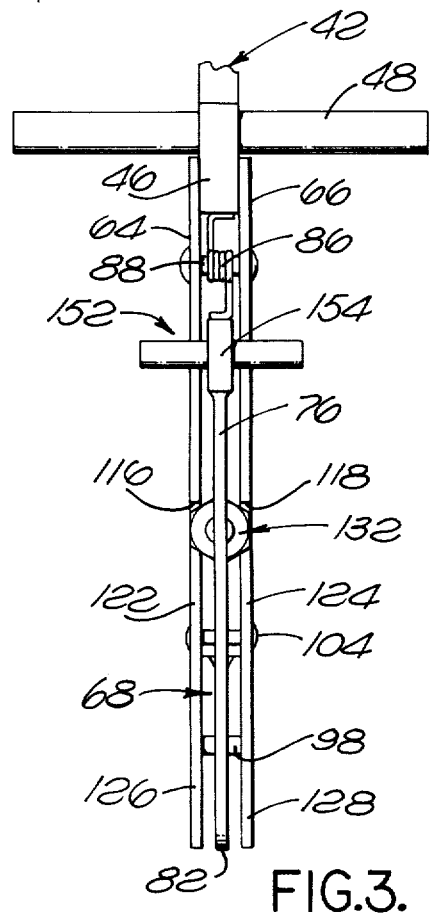
FIG. 3 is an end view, of the carrier of FIG. 2.

A paper gripping section 62 is secured to the lower portion 46 of the stabilizer 42 and is formed of a pair of parallel plates, shown in greater detail in FIG. 3 which are riveted together about the lower portion 46 of the stabilizer. The plates 64 and 66, which are riveted on opposite sides of the stabilizer 42, are spaced apart a distance equal to the thickness of the stabilizer.

Mounted between the plate 64 and the plate 66 are a first spring-loaded device 68 and a second spring-loaded device 72. The frist spring-loaded device is formed of a generally T-shaped member having a arm 74 and downwardly extending tang or leg 76. The first spring-loaded member pivots about a rivet 78 which is secured to one end of the arm 74 and extends between the plates 64 and 66. The free end 82 of the leg 76 is tapered at its edge 84 facing the rivet 78.

A first spring 86 is wound about a rivet 88. The rivet, positioned between a bottom of the stabilizer 42 and the top of the arm 74, extends between the plates 64 and 66. The spring 86 extends between the bottom surface of the stabilizer 42 and the top surface of the arm 74. Thus, the spring 86 tends to move the first spring-loaded device 68 downwardly in a position shown by the solid lines in FIG. 2.

The second spring-loaded device 72 is formed of a pair of identical tear-shaped pawls 92 and 94. The pawls 92 and 94 are positioned adjacent each other between the plates 64 and 66 and are secured at their enlarged end by means of a first pawl rivet 96 fastened between the plates 64 and 66. A second pawl rivet 98 is mounted between the plates 64 and 66 directly below the pawls 92 and 94 and limits the downward movement of the pawls.

A second spring 102, is mounted between the plates 64 and 66, directly above the pawls 92 and 94 and is wound about a rivet 104. The spring 102 is biased against the pawls 92 and 94, and tends to keep the pawls adjacent the second pawl rivet 98. The tapered ends 106 and 108, of the pawls 92 and 94, respectively, have adjacent chamfered surfaces 112 and 114, respectively, which when adjacent each other, define a V-shaped slot. The tapered edge 84 of the first spring-loaded device is normally spring-biased between the pawls 92 and 94 at the V-shaped slot.

The plates 64 and 66 each have a portion thereof removed, as shown in FIG. 2, along a horizontal line 116 enabling the lower free half of the leg 76 of the first spring-loaded member to be exposed. Additionally, a portion of the plates 64 and 66 are removed from the end of the horizontal line 116 along vertically extending surfaces 122 and 124 which curve at a lower portion 126 and 128, respectively. The portions 126 and 128 taper away from the tapered surface 84 of the leg 76. When the leg 76 is in a vertical position, as shown in solid lines in FIG. 2, the vertically extending surfaces 122 and 124 are spaced from the adjacent surface of the leg 76.

Figure 4:
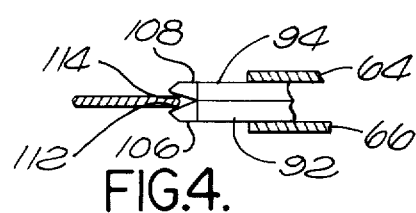
FIG. 4 is a sectional view of the releasing mechanism used in the carrier of FIGS. 1–3 taken along line 4—4 of FIG. 2.

To provide an adjustable stop for the downward movement of the first spring-loaded device 68, a screw 132 is positioned between the plates 64 and 66 just below the horizontal surfaces 116 and 118 and in a plane parallel thereto. A first washer 134 abuts the vertical surfaces 122 and 124 and is mounted on the screw 132 and is secured thereto by means of a nut 136. A second washer 138 is positioned on the screw 132 at the other end thereof adjacent the outer edges of the plates 64 and 66, by means of a nut 142, enabling the screw 132 to be maintained in a plane parallel to the horizontal surfaces 116 and 118. The end 144 of screw 132, positioned adjacent the leg 76 of the first spring-loaded member 68, determines the maximum downward position of the first spring-loaded device 68. Normally, as is illustrated in FIG. 4, the screw 132 is adjusted by means of the nuts 136 and 142 so that the edge 84 of the leg 76 extends between the chamfered surfaces 112 and 114 of the pawls 92 and 94, respectively. The second spring 102 normally provides less tension on the tear-shaped pawls 92 and 94 than does the first spring 86 on the first spring-loaded device 68. Thus, when a paper, such as the paper 32 is inserted between the spring-loaded members, as illustrated in FIG. 1, the pawls 92 and 94 move upwardly initially. The pawls then move downwardly due to the tension of the spring 102. The paper 32 is then secured between the pawls 92 and 94 and the leg 76 of the first spring-loaded device 68.

To release the paper 32 in the station 34, a releasing mechanism in the form of a bar 152 is formed on the arm 74 of the first spring-loaded member 68. The releasing mechanism bar 152, as shown in FIG. 3, extends transversely through the arm 74 at its end 154 which extends beyond the ends of the plates 64 and 66. Typically, a cammed surface (not shown) can be provided within the station 34 so that as the carrier 62 enters the station, the releasing mechanism bar 152, rides up the cam surface causing the leg 76 to separate from the pawls 92 and 94 as shown in dotted lines in FIG. 2. The paper secured between the spring-loaded devices is released as the first spring-loaded member moving to a position shown by the dotted lines in FIG. 2. When the carrier 62 leaves the station 34 the first spring-loaded member will return to the position shown by the solid lines in FIG. 2 and is again ready to hold a document.

It should be noted that the releasing mechanism bar 152 extends on both sides of the arm 74. In conventional usage, one of the sides may be removed in alternate carriers so that the releasing mechanism may be operated at different stations. Additionally, different configuration releasing mechanisms formed of different lengths on the mechanism bar 152 can be provided for actuation at different stations.

We claim:
1. A document distribution system comprising:
means for releasably securing a sheet of paper between a first spring-loaded member and a second spring-loaded member; said first spring-loaded member being connected to and simultaneously movable with a releasing mechanism for enabling said first spring-loaded member and said releasing mechanism to be pivotal about the same point on the housing;
said second spring-loaded member being movable about a second point on said housing, said first and second spring-loaded members being biased by a first and second spring, respectively, for biasing said spring loaded members at different tensions, said second spring-loaded member being biased by a spring whose tension is less than the tension of the spring biasing said first spring-loaded member for enabling said second spring-loaded member to pivot and separate from said first spring-loaded member by insertion of said paper between said spring-loaded members;
means for securing said housing to a stabilizer for retaining said housing in a predetermined position when said paper is released from between said spring-loaded members; and trolley means pivotably secured to said stabilizer means and attached to a movable member for transporting said stabilizer along said track.

2. A document distribution system in accordance with claim 1 wherein said first spring-loaded member and said releasing mechanism are formed of a pair of intersecting members formed in a single plane.

3. A document distributing system in accordance with claim 2 wherein said first spring-loaded member and said releasing mechanism are formed in a generally T-shaped configuration with said first spring-loaded member having a gripping end for mating with said second spring-loaded member.

* * * * *